(12) United States Patent
Kelley

(10) Patent No.: US 10,460,591 B2
(45) Date of Patent: *Oct. 29, 2019

(54) PORTABLE WEARABLE PRIMARY DEVICE WHICH COMMUNICATES DATA TO SECONDARY DEVICE THAT IS IN COMMUNICATION WITH MULTIPLE NETWORKS AND RELATED COMMUNICATION SYSTEMS

(71) Applicant: Silent Beacon, LLC, Potomac, MD (US)

(72) Inventor: Kenny Kelley, Barnsville, MD (US)

(73) Assignee: Silent Beacon, LLC, Rockville, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 15/695,948

(22) Filed: Sep. 5, 2017

(65) Prior Publication Data
US 2018/0082574 A1  Mar. 22, 2018

Related U.S. Application Data

(63) Continuation-in-part of application No. 14/631,702, filed on Feb. 25, 2015, now Pat. No. 9,756,454.

(51) Int. Cl.
| | |
|---|---|
| *H04W 4/08* | (2009.01) |
| *H04W 4/00* | (2018.01) |
| *H04M 1/02* | (2006.01) |
| *G08B 25/01* | (2006.01) |
| *G08B 25/00* | (2006.01) |
| *H04M 1/725* | (2006.01) |
| *G08B 7/06* | (2006.01) |

(52) U.S. Cl.
CPC ............. *G08B 25/016* (2013.01); *G08B 7/06* (2013.01); *G08B 25/005* (2013.01); *G08B 25/009* (2013.01); *G08B 25/014* (2013.01); *H04M 1/7253* (2013.01)

(58) Field of Classification Search
CPC ...... G08B 25/016; G08B 7/06; G08B 25/005; G08B 25/014; H04M 1/7253; H04M 1/02; H04W 4/08; H04W 4/00
See application file for complete search history.

(56) References Cited

U.S. PATENT DOCUMENTS

| | | | | |
|---|---|---|---|---|
| 6,222,484 B1 * | 4/2001 | Seiple | ................... | B63C 9/0005 342/357.55 |
| 6,751,484 B1 * | 6/2004 | Sandelius | ............... | H04M 1/22 455/226.1 |
| 7,844,247 B2 * | 11/2010 | Chen | ..................... | G08G 1/205 455/404.1 |

(Continued)

*Primary Examiner* — Edward Urban
*Assistant Examiner* — Ralph H Justus
(74) *Attorney, Agent, or Firm* — Andrew C. Aitken

(57) ABSTRACT

A personal portable communication device and system is provided which includes a handheld beacon that has a controller, a short range signal transmitter, and a power source, and at least one switch, an indicator light and a short range signal receiver that transmits and receives signals to a secondary relay communication device such as a smartphone wherein the secondary device sends second communication signals including messages according to predetermined instructions to predetermined destinations.

15 Claims, 12 Drawing Sheets

(56) References Cited

U.S. PATENT DOCUMENTS

| | | | | |
|---|---|---|---|---|
| 7,907,931 B2* | 3/2011 | Hartigan | ............ | G08B 21/0277 |
| | | | | 342/357.2 |
| 2010/0303220 A1* | 12/2010 | Brooks | ................... | H04M 3/46 |
| | | | | 379/142.05 |
| 2014/0106677 A1* | 4/2014 | Altman | ................ | H04B 1/3827 |
| | | | | 455/41.2 |

* cited by examiner

PORTABLE WEARABLE PRIMARY DEVICE WHICH COMMUNICATES DATA TO SECONDARY DEVICE THAT IS IN COMMUNICATION WITH MULTIPLE NETWORKS AND RELATED COMMUNICATION SYSTEMS

This is a continuation-in-part of U.S. Ser. No. 14/631,702 which issued as U.S. Pat. No. 9,756,454 on Sep. 5, 2017. The Applicant claims the benefit of U.S. Application No. 62/000,178 filed on May 19, 2014.

This invention is directed to a portable device and system for a person to communicate with multiple recipients over an established network. The device connects wirelessly to a pre-existing local communications module that is in turn connected to a network. The device triggers an application within the local communications relay module—such as a cellphone—to invoking a series of actions. The local relay communications module can be, but is not limited to, a smartphone, tablet or home computer. The application running in the local communications module relays preselected information over a network. The process can be reversed whereas a signal is transmitted to a local communications module that includes the application and is relayed to the primary device.

FIELD OF THE INVENTION

The present invention relates to a portable device which is used to communicate with multiple recipients using numerous means of communication, and can be triggered by different scenarios including medical situation or being in a potentially dangerous situation.

BACKGROUND OF INVENTION

Although there are more cell phones in the United States then people, the FBI statistics of people who are involved in emergency situations is staggering. Every second in the United States someone is involved with a car accident. A property crime occurs every 3.5 seconds in the United States. Every 5 seconds someone is a victim of larceny, aggravated assault, every 42 seconds, a robbery every 1.5 minutes, a rape every 6 minutes and a murder every 36 minutes. Hundreds of people go missing each day in America and thousands are abducted each month.

The elderly demographic, defined as persons older than 56 years old, is the one of the fastest growing group of mobile device users and has been reported up 18% in the last few years. While there are existing alert systems that are optimized and marketed to the elderly, many of these alert systems use the outdated. Some derive from a pendant that is wirelessly connected with a speaker system located somewhere inside a house. Other systems involve the transmission of a predetermined message using cellular transmission. However, many senior citizens remain active and do not need to be constrained within the confines of their home to feel secure or have access to a security or alter system. It is an object of the present invention to provide these people an alert system that enhances their independence to allow them to enjoy life.

It is an object of the invention to provide a simple, inexpensive system that allows people in emergency situations to establish rapid contact with friends, relatives and first responders and to make them aware of emergency situations. In the ever-evolving world of extreme sports, people may be found in unusual emergency situations in remote backcountry areas where contact with others may be limited or infrequent. Moreover, in many instances, people that are active in backcountry recreational activities, such as riding motorcycles, bicycling, skiing, snowboarding and horseback riding, will often wear a helmet and gloves which can impede the ability to easily communicate using a conventional cell phone. For example, in some emergency circumstances, such as after an injury, it may be difficult or impossible to manipulate a conventional cell phone transmitter and a helmet can further impede the use.

If a person becomes lost or is missing, the person's friends and relatives may not be able to easily find them and may be required to obtain a court order to allow for the release of cell phone records that may help locate the person.

The horrific mass shootings that have occurred in recent history also illustrate a need for improved communications technology. In this regard, many police chiefs have instructed people to follow the following protocol who find themselves in these situations: 1) Remove oneself from the dangerous location and retreat to a secure and safe location; 2) Barricade oneself in a safe spot and turn off your cellphone or any device that will ring; 3) Attempt to make contact with third parties without compromising a secret location; and 4) Wait for help.

SUMMARY OF INVENTION

The present invention proves a rapid manner for a user to contact preselected persons by multiple manners including phone calls, texts and email. Further, according to a feature of the invention, recipients of the communication can instantly be made aware of their GPS location and follow the user. The invention also allows the user to send this information to multiple recipients simultaneously or serially using a single command signal which saves battery life, time and the user's strength.

Accordingly, by way of a simple user interface with relatively few buttons, a user can easy initiate communications with predetermined persons in emergency situations. The secondary wireless device can easily be programed with contact numbers. Because communication can be initiated by simply accessing a single switch or button, some of the limitations of present wireless communications devices are mitigated Other objects and features of the invention will become apparent from the following detailed description and accompanying system schematics and flow diagrams. It is understood, however, that the specification and drawings, are solely to illustration and describe specific embodiments of the invention and are not intended to limit the invention, for which reference should be made to the appended claims.

DETAILED DESCRIPTION

Figure 1:
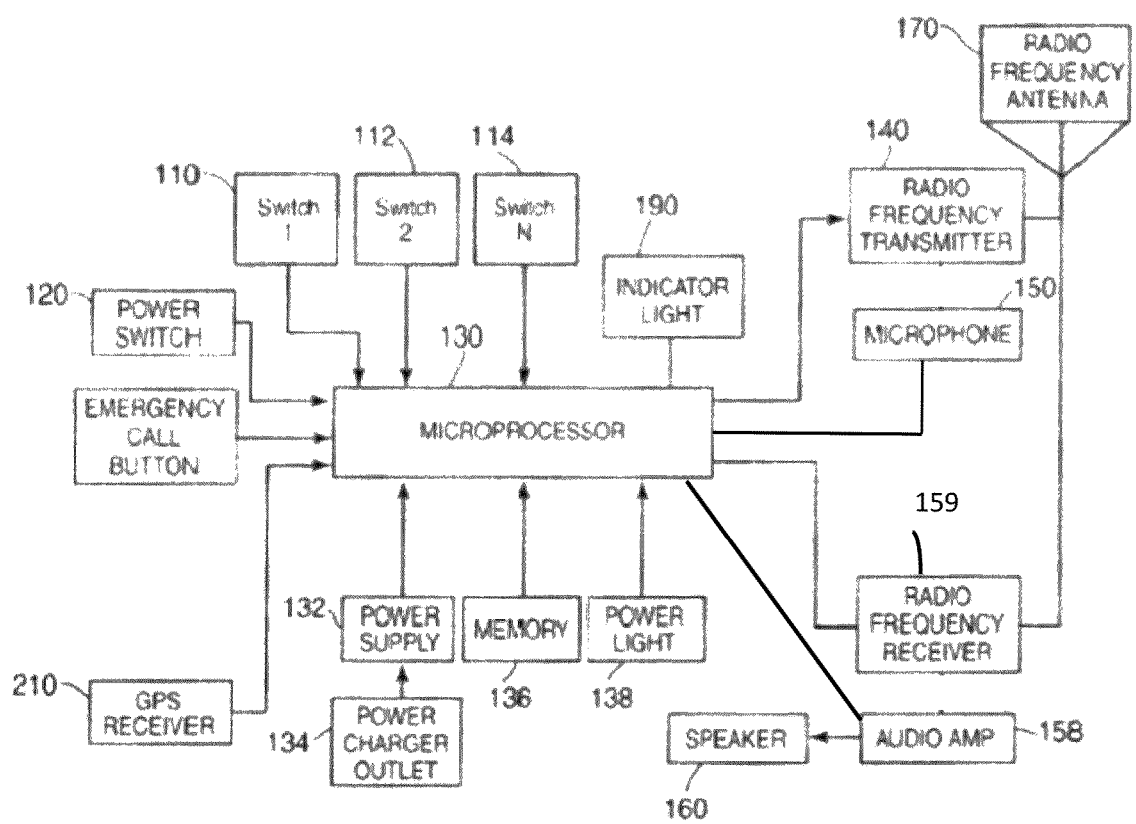
FIG. 1 is a schematic diagram of an overview of an exemplary embodiment of the system architecture of a wireless communication device according to the invention.

Now referring to FIG. 1 an overview of an exemplary embodiment of the system architecture of a wireless communication device is depicted. Wireless communication primary device 100 (which is all of FIG. 1) includes switch 110, 112 and 114. In an exemplary embodiment, contact button 110 may be used to initiate contact with a first address such as a primary emergency contact. Switch 112 may be used to contact a second address such as secondary emergency contact. The third switch 114 may be programed to call an emergency number such as 911 that is used in most regions in the United States. As used herein, the "primary device", the "wireless communication primary device", the "handheld beacon" and the "portable beacon" all refer to the same structure as schematically illustrated in FIG. 1 and in FIG. 2 at Reference No. 250. The contact buttons may have easily identifiable icons or symbols to facilitate easy dialing. In embodiments, these icons or symbols can be altered to correspond to the programming of the application that resides on the local cellular communication secondary device. In embodiments, primary device 100 may also have communications buttons 116, 118. The communication buttons may include talk switch 116 and off switch 118.

Communications primary device 100 is controlled by processor 130 which coordinates the electronic processes of wireless communications primary device 100. Device 100 may also include a power button 120, for activating the primary device 100. In embodiments, a volume switch or dial 122 is provided for increasing or decreasing the speaker volume of the device.

Device 100 also includes power supply 132 which is connected with rechargeable or other batteries. In this embodiment a charger 134 is coupled with a power charging device such as a DC phone charger as known by those skilled in the art.

Wireless communications primary device 100 also has a memory 136 which, when used in conjunction with microprocessor 130, is used to store on board software and/or firmware programs that implement the functionality of the wireless communications primary device 100. Memory 136 may also include storage for phone numbers as discussed above.

Wireless communications primary device 100 may also have power light 138 to indicate the status of the device and can provide information able the battery life. Wireless communications primary device 100 may also have radio frequency antenna 170 which may, as needed, both receive and send radio frequency signals for wireless communication as is known by those skilled in the art. Signals received by a radio frequency antenna 170 are processed by cellular receiver 159, amplified by audio amplifier 158 and, in turn, transmitted through speaker 160 such that an audible signal that may be heard by a user.

The primary device 100 includes a microphone 150, which when coupled with the blue tooth radio transmitter 140 may wirelessly transmit a signal via radio frequency antenna 170 to the local communication secondary device. An indicator light, vibratory device and accelerometer may also be optionally included with device. In embodiments, the device may initiate a signal based upon input to the controller from an accelerometer.

The wireless communication primary device 100 is described herein as being a "blue tooth" device, other short range wireless communication system may be advantageously used with the device.

Thus the portable primary device 100 includes the components recited above mounted on a PC board and is designed to allow for the transfer of information to and from the secondary device and application designed for receiving the re-transmitting the information. In embodiments Bluetooth 3.0 or 4.0 technology is used to transfer data to and from the primary device 100 to a local secondary device which comprises a smartphone.

Bluetooth 4.0 refers to a standard is a wireless technology standard for exchanging data over short distances using short-wavelength UHF radio waves in the ISM band from 2.4 to 2.485 GHz. Bluetooth was first standardized as IEEE 802.15.1 but the standard is no longer maintained. The Bluetooth Special Interest Group presently oversees the development of the specification, manages the qualification program, protects the trademarks.

The communication protocol allows the application running on the secondary device to signal the primary device itself as well as provide audio communication via the speaker. The exterior of the device is constructed from a waterproof material to be able to connect during a storm or even after submergence in water.

In embodiments, the primary device can also be triggered by proximity sensor or a rapid change in heart rate that would alert the Network. The primary device also includes the means to transfer signal to a network, send and receive real time audio transmissions, include a method of powering an LED to bring visual awareness as well as buttons that are used to trigger the Network via the application.

Data that is transmitted from the primary device may include voice, preselected alert notifications, status information of the device, geographic position, and other data collected from input sensors. In addition to a microphone, the input sensors may include accelerometers, and photodetectors. Data transmission may be triggered by the activation of a switch by the user or be activated by other preselected input such as a signal from an accelerometer.

Accordingly embodiments of the portable primary device include a speaker, microphone, rechargeable battery, battery cable connection port, waterproof shell, LED light and input switches. It may be worn, strapped, clipped or mounted on user or object. After a switch or sequence of switches is activated, a signal to the local is transmitted to a network. The network includes but is not limited to, mobile phones, house phones, laptop, home or office computer, smartphone, satellite phone, Wi-Fi. Functions for the device are provided by the application, wherein a series of actions may be invoked upon reception of a signal from the primary portable device.

Figure 2:
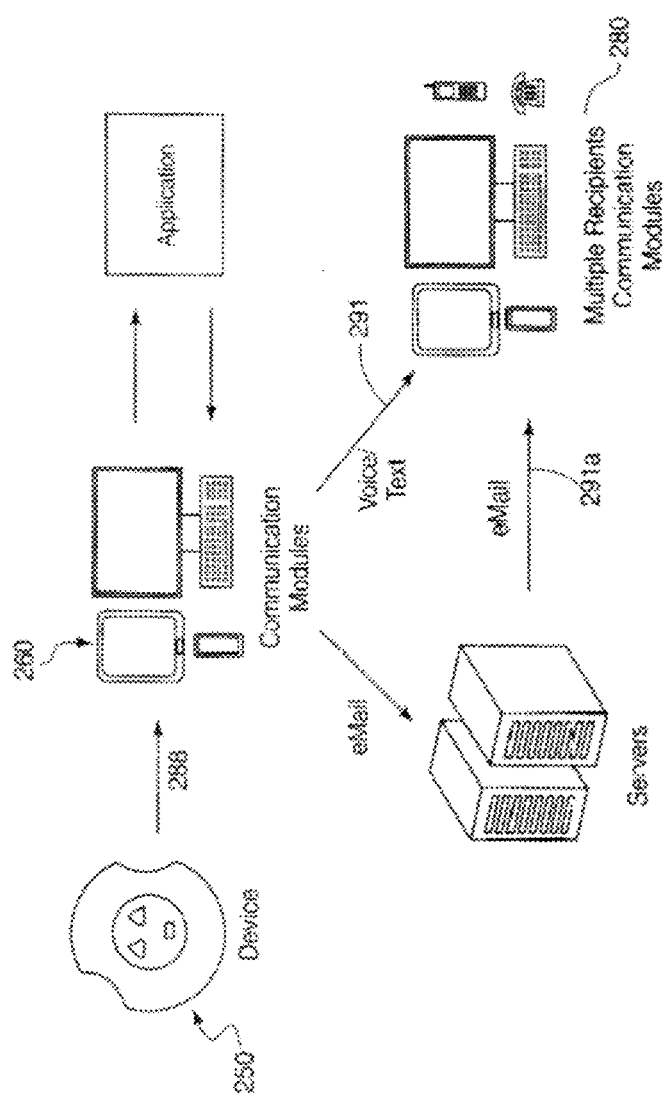
FIG. 2 is a schematic diagram of an overview of another exemplary embodiment of the system architecture of a wireless communication device including the device and cellular smartphone communications module.

Now referring to FIG. 2, the system includes the primary device 250, and a secondary device 260 that is connect to a communications network 291. In preferred embodiments, the secondary communications device is a smartphone running an application that allows the primary device to activate the communication functions of the phone. The application in the cellphone allows user input, including data relating to phone numbers, to be dialed in response to communication from the primary device. In addition, a communication protocol that includes text messaging, and the replay of GPS data generated from either the primary or secondary device may be transmitted in response to predetermined signals from the primary device. If a voice connection has been made, the system will allow for voice communication from primary device, through the secondary device to a third party at a remote destination.

Figure 3:
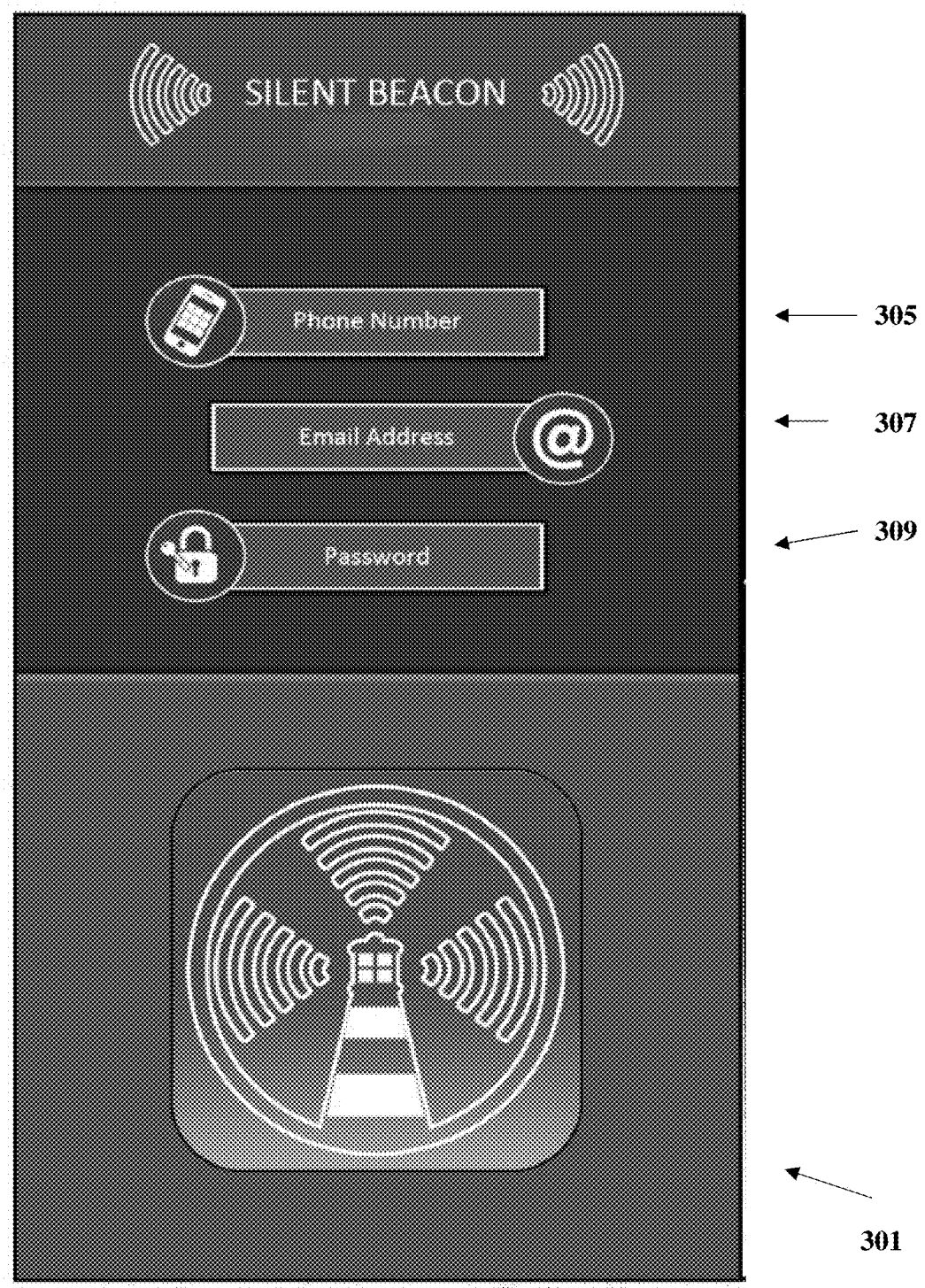
FIG. 3 is a screen display of the software application than may be operated on the cellular smartphone.
Figure 4:
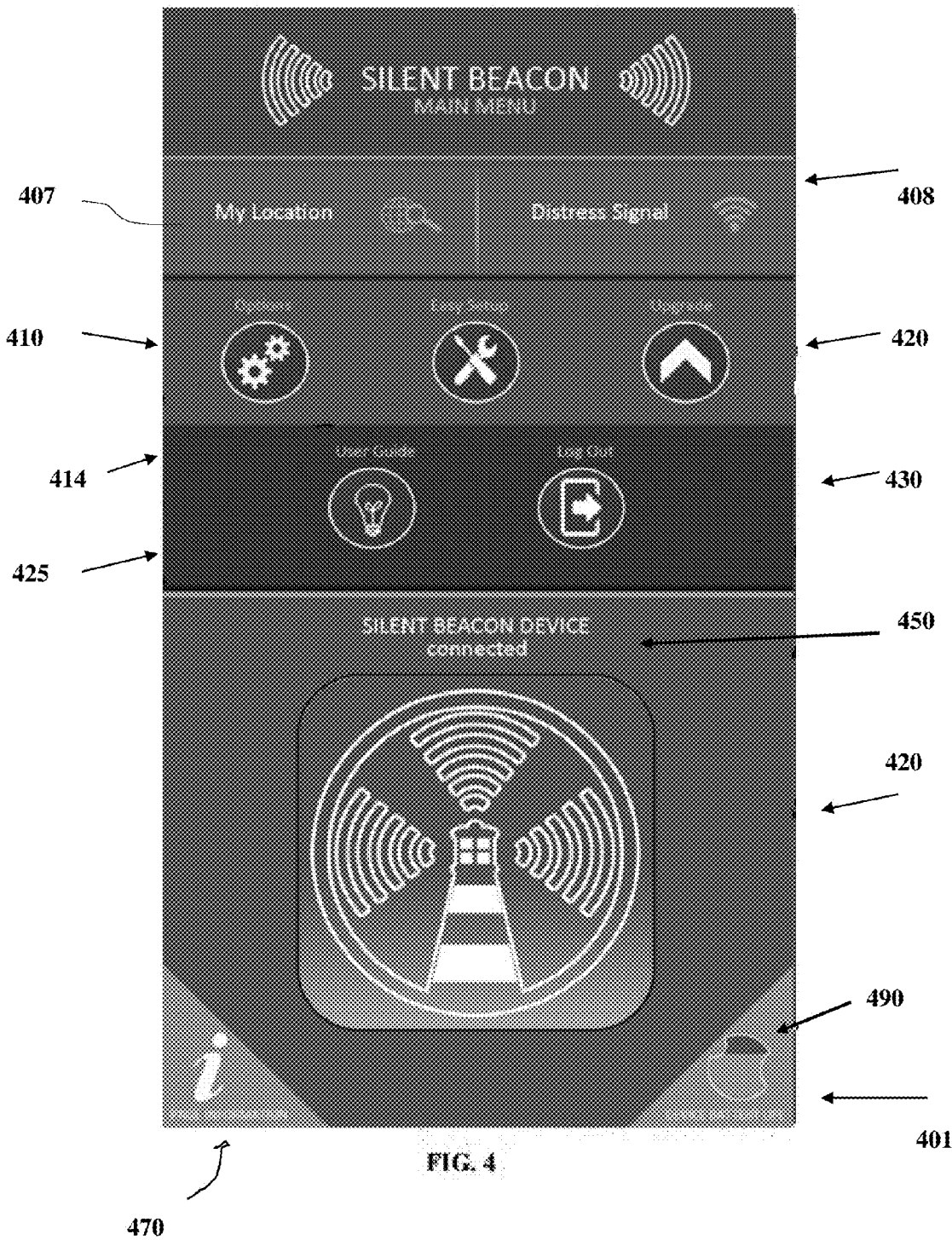
FIG. 4 is a screen display of the software application than may be operated on the cellular smartphone.

FIG. 3 is a screen display 301 of the welcome screen for the application that is run on the secondary communication device or smartphone. In the embodiment depicted in FIGS. 3-12, the smartphone has a touch screen and that allows the functions discussed herein to be implemented. To access the system, a user must enter a phone number at field 305, an email address at field 307 and password at field 309. This shows the logon and user information screen, using the user's phone number it gives a unique 2 way verifying process connecting to our server for tracking and database services allowing others to connect as well FIG. 4 is a screen display 401 main menu that includes menu selections my location 407, that allows the user to activate GPS functions. A large beacon switch or button 420 is located at the bottom for emergencies. The color of the activation button changes from gray to blue when the device is connected to the primary device via Bluetooth communication, therefore reflecting that existence of the signal. When a user physically presses the emergency button on the device, the location will again respond by changing the color of the button to red and the application will initiate the emergency communication protocol. The screen includes a 'My Location' feature 407 that shows the users current location used for tracking or identified whereabouts. In addition, it includes a 'Distress Signal' 408 alerts users of the detection of a signal from the primary device to reflect the existence of an emergency situation. Clicking this location on the screen will access the user's information and map of the user's current location. FIG. 4 also illustrates other accessible features of the system including "Options" 410 that allows the user to access a screen to allow the control and adjustment of various functions on the device, as well as enabling and disabling various functions. See FIG. 12. The "Upgrade" feature 420 allows users to add extra functionality to the application. The "User Guide" function 425 provides information regarding the features and functions of the system. The "Log out" function 430 logs the user out of the application. The "Page Information" function 470 at bottom left provides information relating to the functionality of each button, switch or link on the screen. At the bottom right of the display, a "Battery" icon 490 is provided that shows the amount of power that is remaining on the device. A shortcut to the easy set-up function is provided at link 414.

Figure 5:
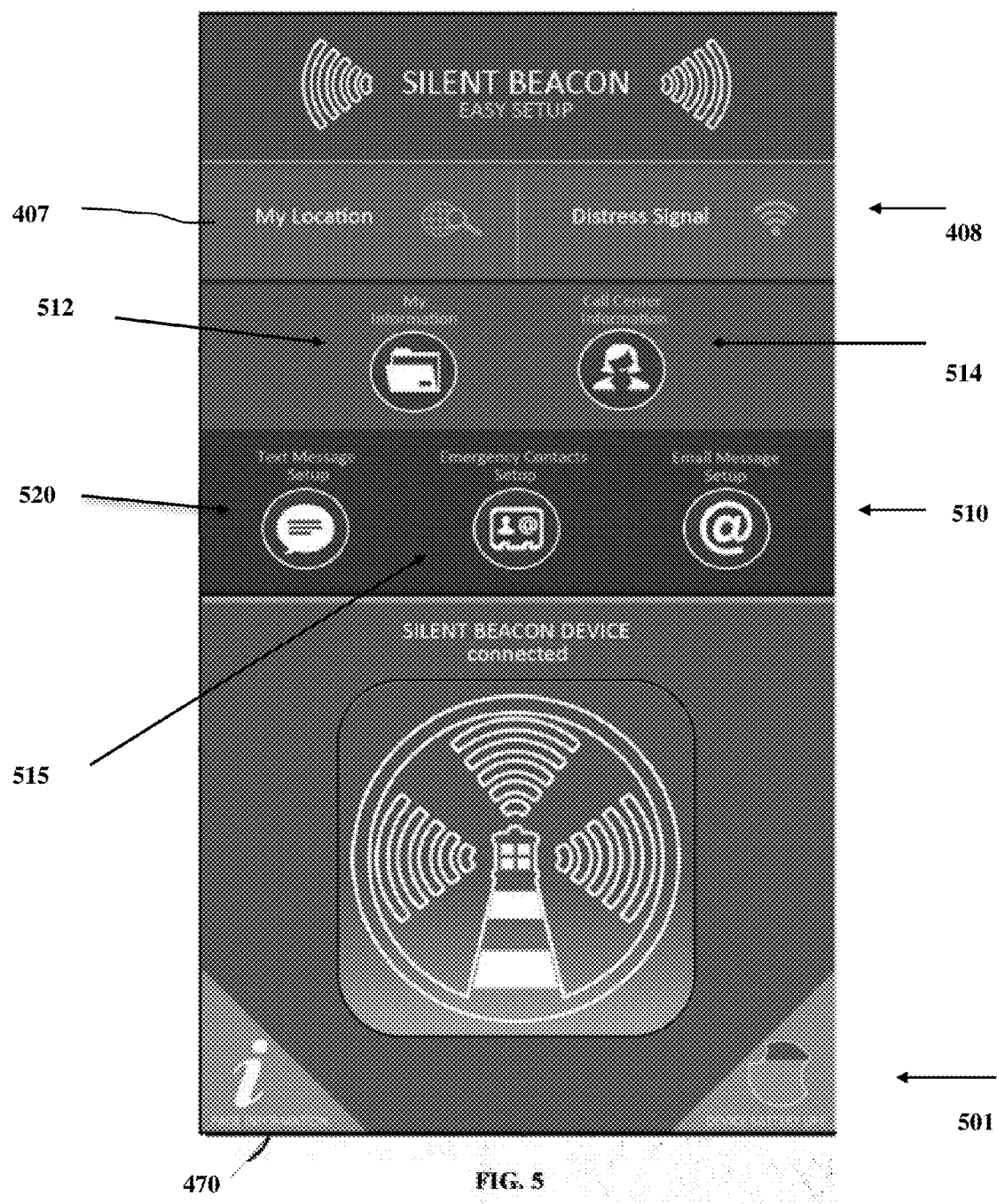
FIG. 5 is a screen display of the software application than may be operated on the cellular smartphone.

Now referring to FIG. 5, an "Easy Setup" display screen 501 is depicted. This device interface allows users to store their information and set up the device, including adding their respective contacts and provide input for the various other options available. The "My Information" field 512 provides a link to a screen to accept data entry and allows the user to set up his personal information including setting up various features like his or her email address and phone carrier. In an embodiment, the system includes a "Call Center Information" field 514 that allows a user to access or make direct contact to a support call center operated by the service provider that can assist with the setting up a user account. The user may also use the call center for other technical support and ask questions pertaining to the service or implementing features of the system. The "text message setup" field 520 allows users to create a custom message and title for their emergency text messages. See FIG. 8. The "email message setup" field 520 provides a link to a further screen to allow users to create a custom message and title for their emergency email messages. The "Emergency Contact Setup" field 515 provides a link to another screen that allows users to add emergency contact information either from phones contacts or manually. (screen 5a)

Figure 6:
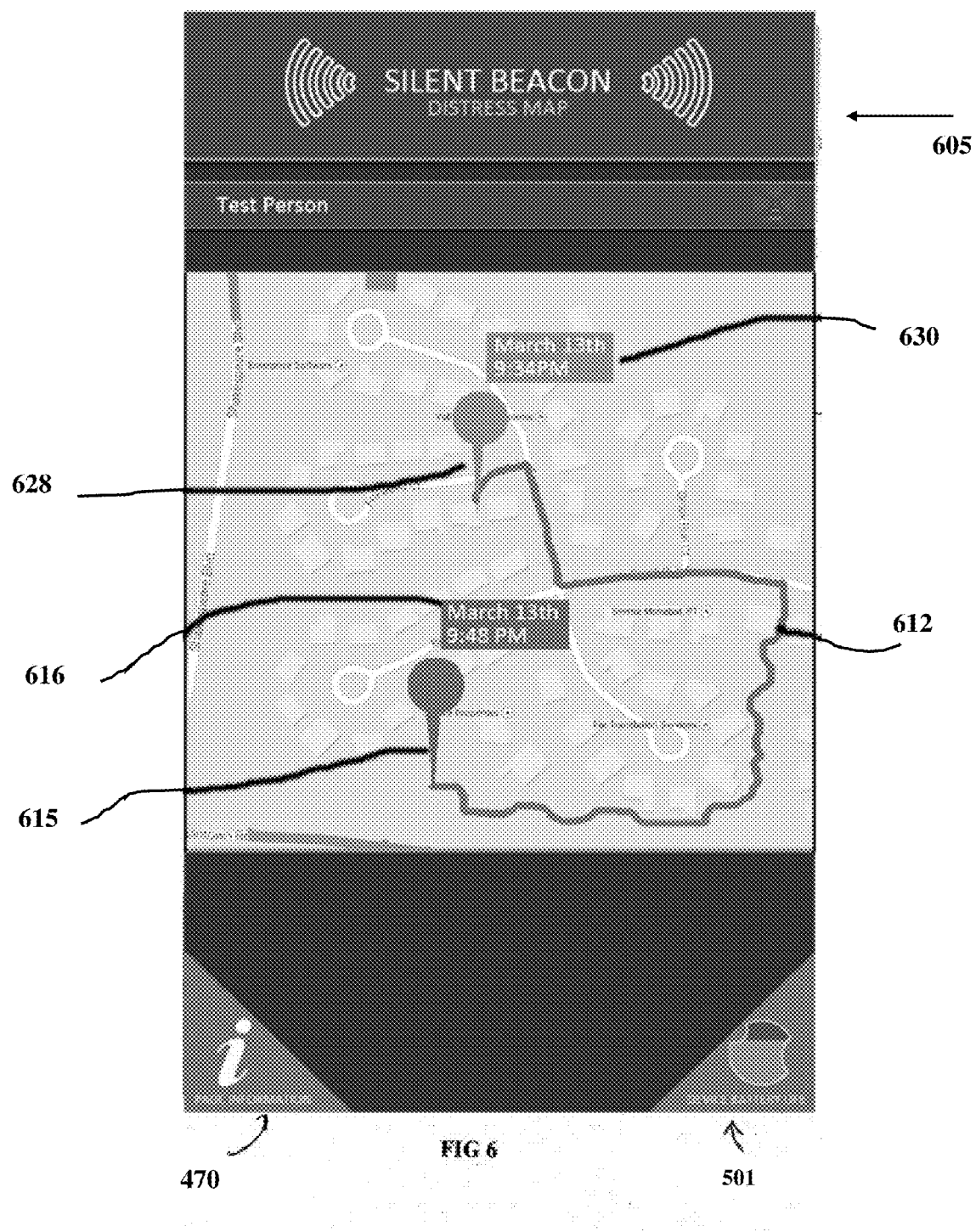
FIG. 6 is a screen display of the software application than may be operated on the cellular smartphone.

FIG. 6 is a screen display of a distress map 601. The distress map is displayed when the user gets a push notification, or text, or the silent beacon device alerts you, or the application is open when a contact is in an emergency. In real time, it will show the current GPS location of the person in emergency so that they can be tracked and will transmit the information from the local communication device to a remote location via phone, text or email. The software will drop a marker or pin such as 615 and 628 to identify where the person is and correlate the time with the location. The time of the drop is reflected at referenced number 615 and 628. As the individual moves, a red line is drawn that tracks the pathway 612 and times are correlated at predetermined intervals.

Figure 7:
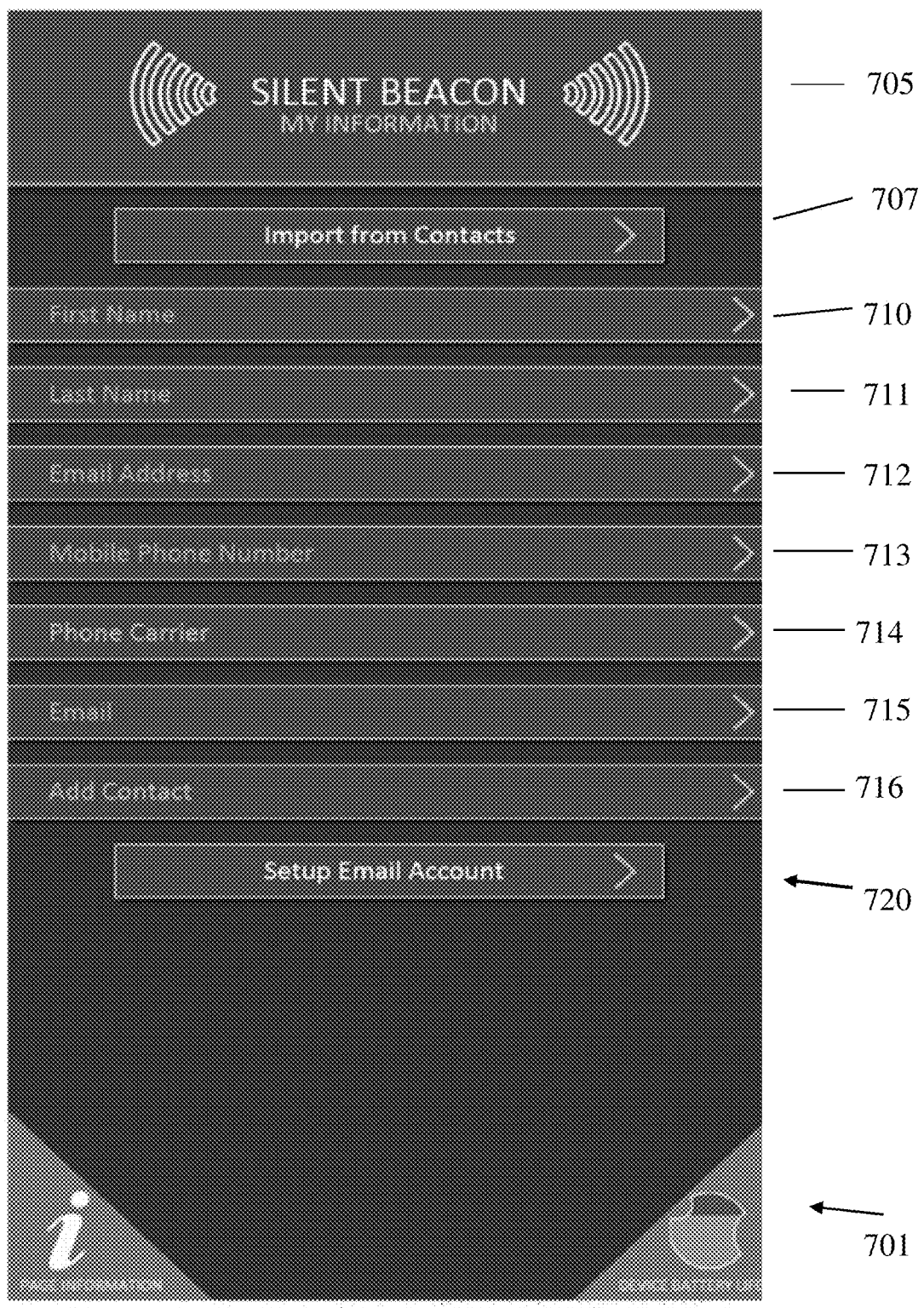
FIG. 7 is a screen display of the software application than may be operated on the cellular smartphone.

FIG. 7 is the "My Information" screen display 701. This screen allows for various information of the user to be stored and modified. One feature of this display allows the user to import the information from a contact listing. A user enters his or her first and last name along with the users email address, mobile number, the user's mobile phone carrier and other information can be entered at the user's option. This screen also provides for the functionality for setup of an email account to be used in distributing the emergency alert. The screen includes an activation link to 707 allow importing data from contacts. The user may also manually enter data in fields provided including first name 710, last name 711, email 712, mobile phone 713, carrier information 714. The device also allows the user to set up an email account at link 720.

Figure 8:
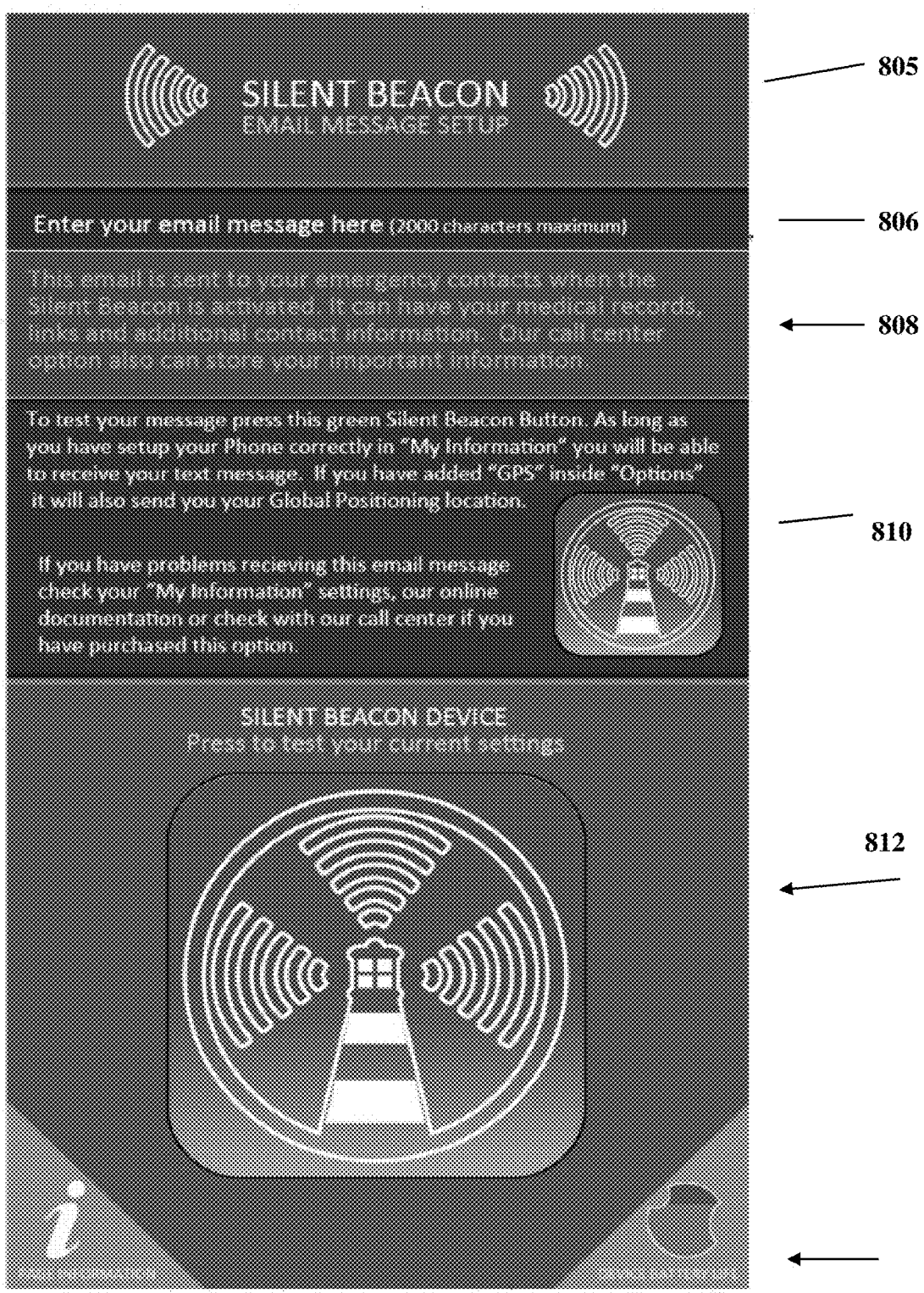
FIG. 8 is a screen display of the software application than may be operated on the cellular smartphone.

Now referring to FIG. 8, an Email Message set up display screen 801 is displayed. This page allows the user to setup a custom email message by activation of link 806 that will be transmitted to selected emergency contacts and used to advise the contacts that they are in an emergency situation. The text if the email is displayed at field 808. The user can test the settings by activation on the smaller beacon icon that is reflected in the present embodiment by a green lighthouse icon in field 810.

Figure 9:
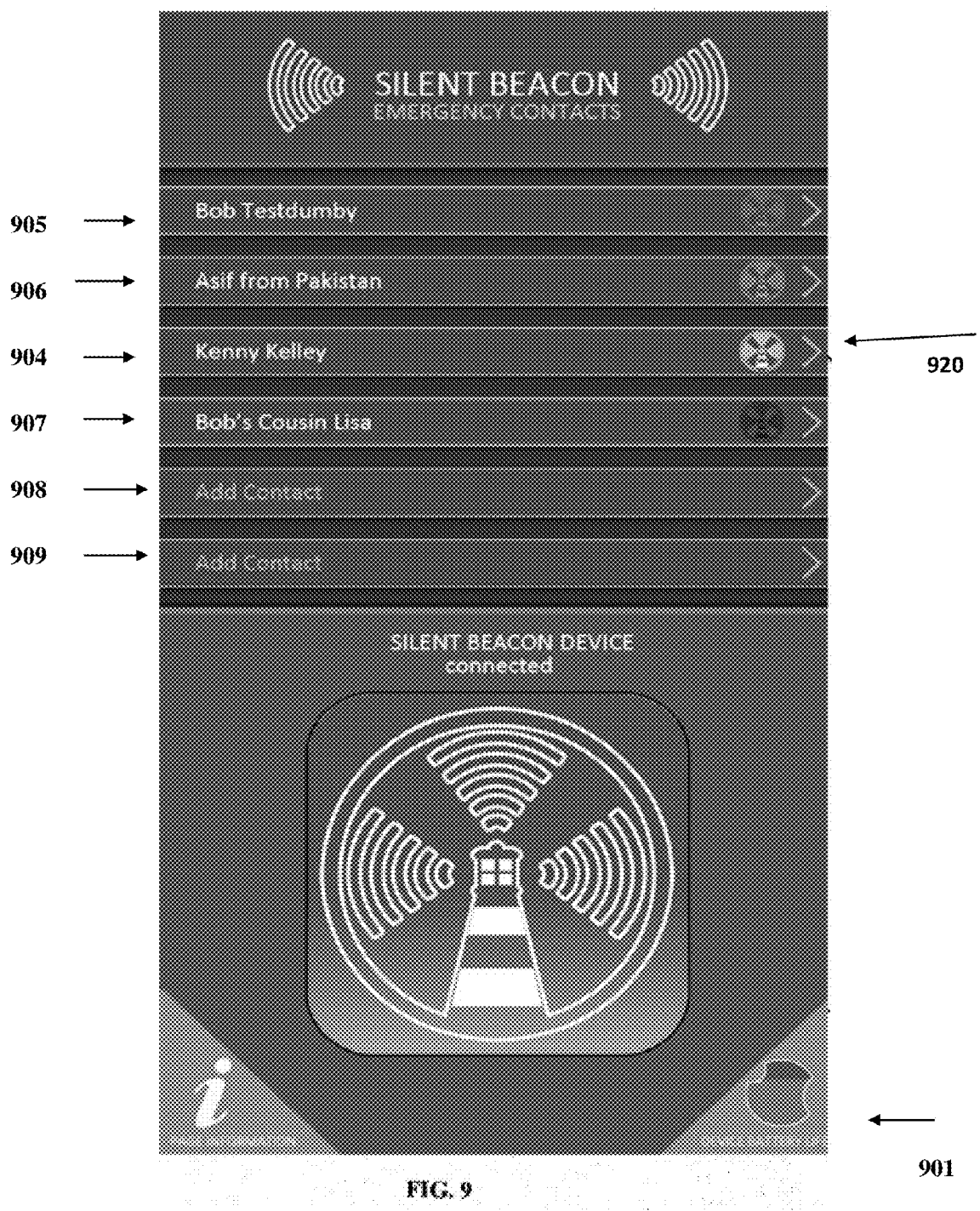
FIG. 9 is a screen display of a software application reflecting emergency contacts data that may be entered by the user of the device according to an embodiment of the invention.

FIG. 9 is the "Emergency Contacts" display screen 901. Screen 901 provides a list of emergency contacts 905-907 as well as fields to allow data entry to add additional contact 908 and 909. Upon activation of the link, a new screen is opened and the relevant data may be entered into the application. Where a user may provide data relating to emergency contacts are added including data fields 904-909. The user may add manually contact information via a contacts list stored within the mobile smartphone device as well as edit them. There is a small beacon, such as beacon 920 associated with each contact that identifying by color the status of the users. In this embodiment, gray indicate the contact is not connected; the color blue indicates that that contact is connected, and red indicates the contact is in an emergency status. The user can click or access each of the user's name to show their GPS positioning in real time.

Figure 10:
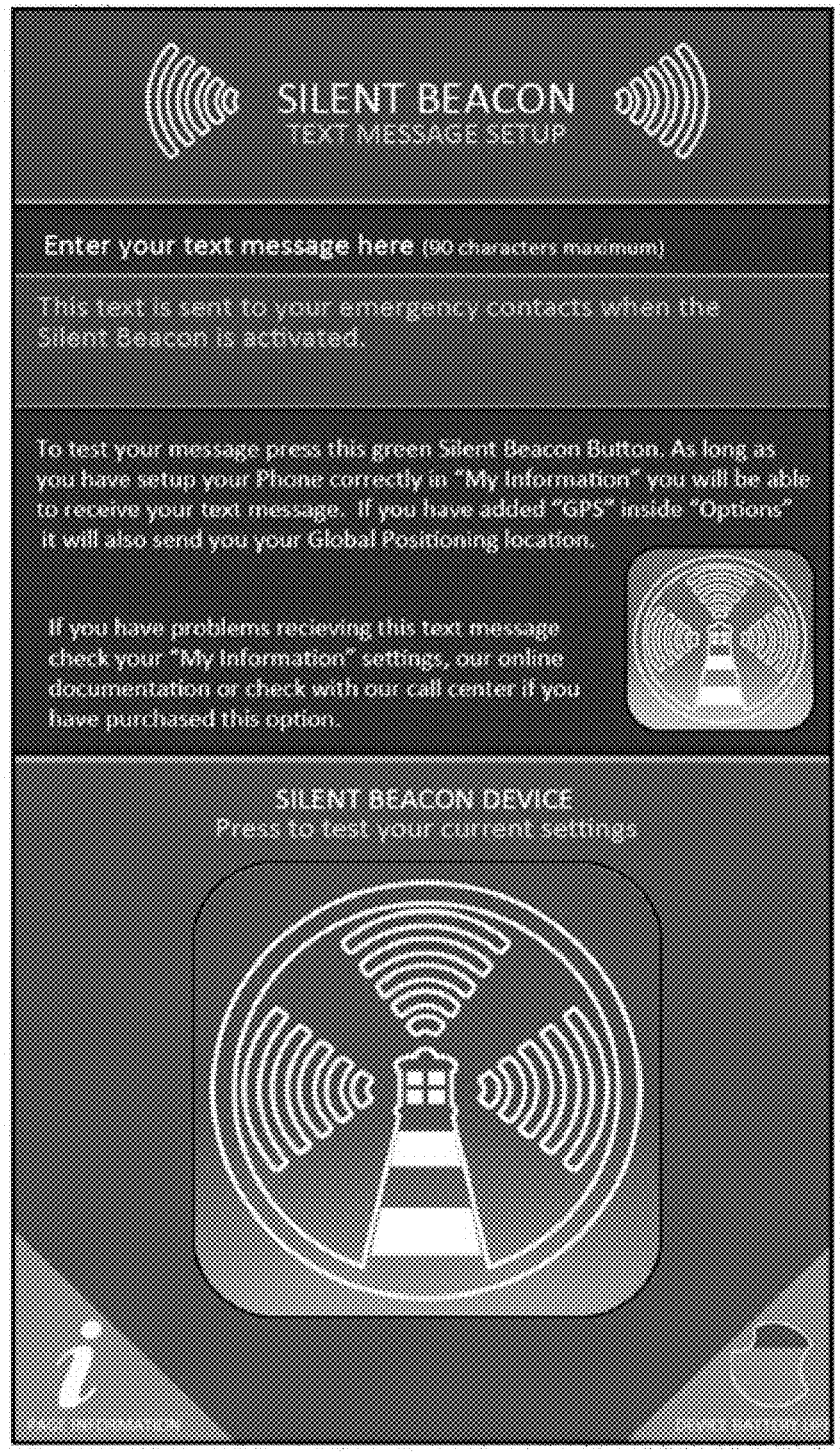
FIG. 10 is a screen display of the of a software application reflecting a screen that allows for contact data import according to an embodiment of the invention.

FIG. 10 is a Text Message display screen. This display allows the user to enter information to setup a custom text message letting their emergency contacts know they are in an emergency situation. The user may test the settings on the smaller beacon icon in green.

Figure 11:
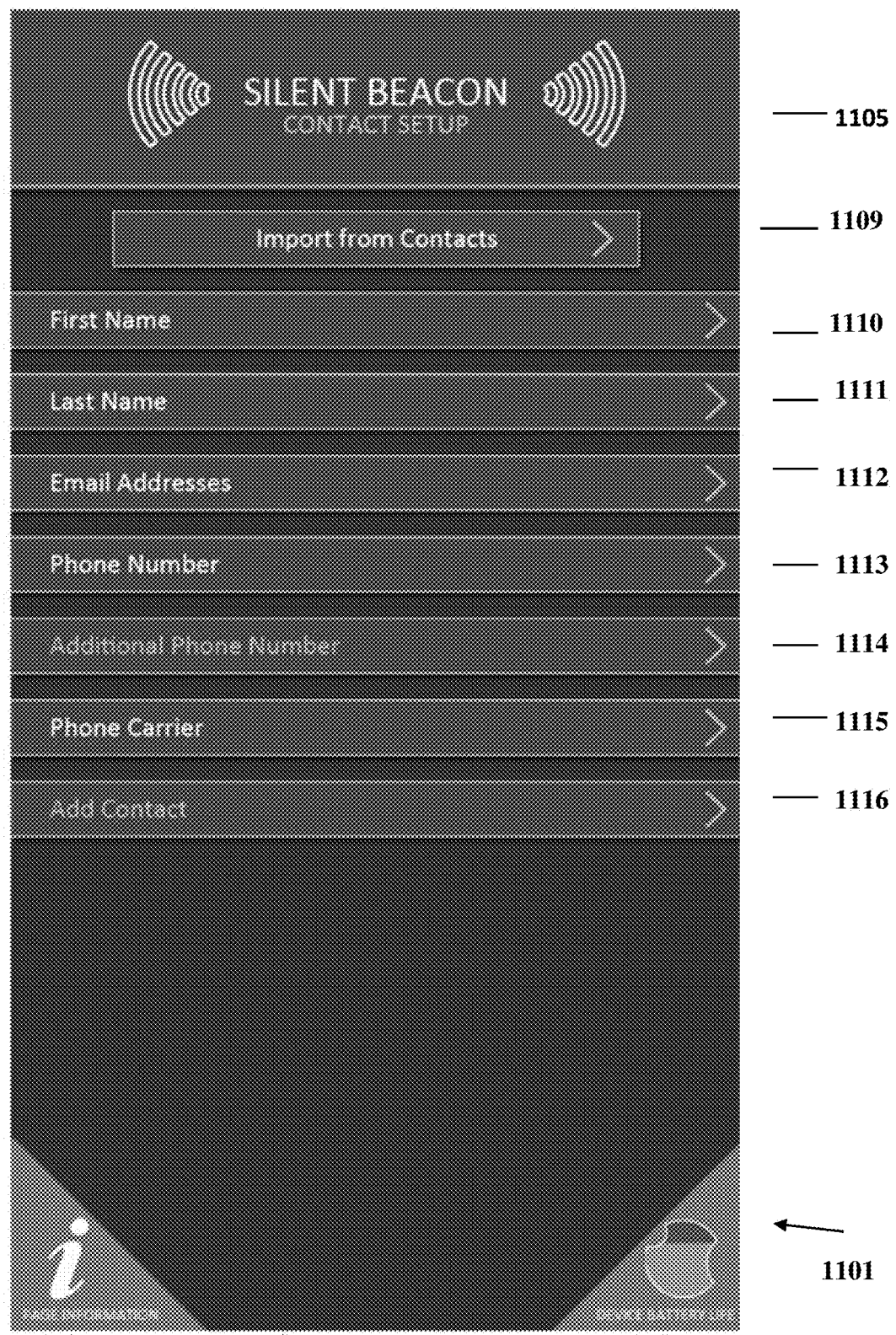
FIG. 11 is a screen display of the of a software application reflecting a screen that allows for contact data import according to an embodiment of the invention.

FIG. 11 is the Contact Setup display screen. The Contact Setup display screen allows users to add the fields of their emergency contacts. This setup can be manually inputted with data or the data may be imported from the smartphone contact list. The data fields that may be populated include (1) the user's first and last name (2) user's email address (3) the user's mobile number (4) additional phone numbers and (5) the user's mobile phone carrier.

Figure 12:
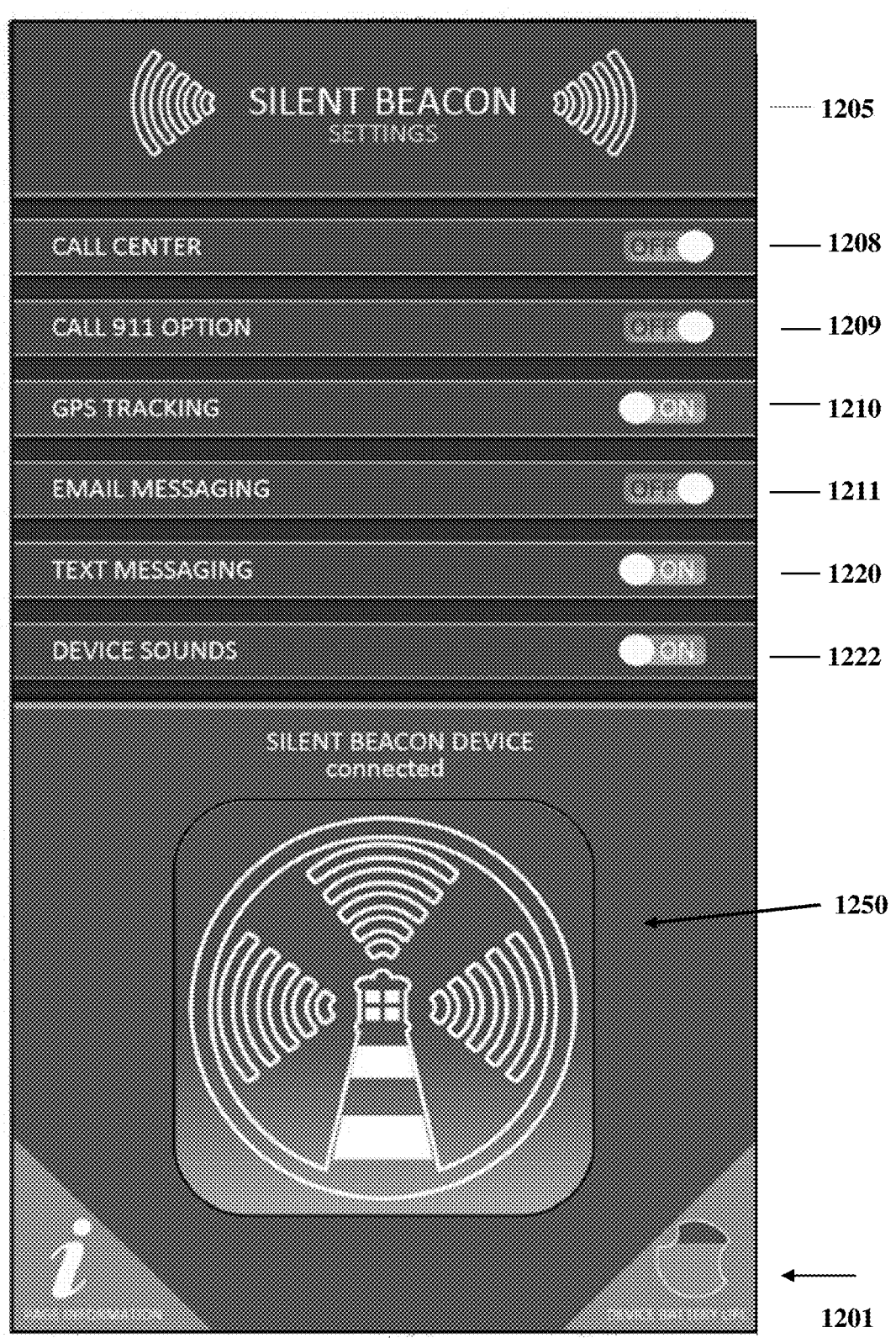
FIG. 12 is a screen display of the of a software application reflecting an options/Settings display screen according to an embodiment of the invention.

FIG. 12 is the "Options/Settings" display screen. This screen allows users to select communications options including Activating the Call Center call option", 911, GPS Tracking enabling, Email Messaging, Text messaging, and device sounds.

The application on the secondary communication device may access a local memory or can access memory stored on the network. This information may include but is not limited to names, email addresses, phone numbers, social media, and other contact information that identifies a person.

The application utilizes functions within the network and can communicate with multiple recipients. Forms of communication include but are not limited to, email, SMS messaging, push notifications, app alerts, video chat, voice calls, audio recordings and instant messaging.

In an embodiment, the user may choose which forms of communication are to be used. The option of turning them on or off is within the application installed on the smartphone. Options include but are not limited to, texting from the secondary device of a user's location using a GPS function, texting to turn on tracking, email to show GPS location, email to alert that a user is in distress or needs assistance, contacting multiple people at once, contacting an emergency response center to communicate your current emergency. The application also connects to servers which relay in real-time the location of the network triggered by the portable device.

Anyone who is connected to the user and possesses the application and portable device will be alerted if someone else has alerted the network. The application itself displays who has altered the network and they will be able to be viewed in real time with GPS. In an embodiment, a call center can automatically track a subscriber as well and can relay in real time to authorities or to an emergency response center the whereabouts and condition of the user.

In an embodiment, the application is programmed to sequentially contact persons by phone on the list until a successful call is placed. In another embodiment, the system will phone and text contacts on a predetermined list until a text or phone call is successfully completed or a text is acknowledged and a return text is transmitted. In alternative embodiments, messages and phone calls are simultaneously transmitted upon the activation of the switch. In yet further alternative embodiment of the invention, the user can select the option at the beacon to sequentially attempt to make contact or simultaneously make contact. In the embodiment that involves transmission of text, a signal is transmitted back to the beacon that reflects a responsive text has been received. In alternative embodiment, the text message requests that the recipient call the sender. The application will receive a call and retransmit the voice signal to the beacon or first device.

In a further embodiment, the system, which includes the smartphone application and primary device includes a primary device location assist feature. According to this feature, a user can activate a function provide don the secondary communication device to send a signal to the primary device wherein said signal will activate an audio signal.

In order to reduce or eliminate inadvertent activation of the primary device, in an embodiment, in order to activate the signal from the primary device to the relay communication device, the user must simultaneously engage more than one switch device.

The present invention and its various advantages will be understood from the foregoing description and that it will be readily apparent to those ordinarily skilled in the art so that various changes may be made in form, construction and arrangement without departing from the spirit and scope of the invention. While specific embodiments of the invention have been disclosed and discussed herein, the invention is not intended to be limited by the specific embodiments described in the specification but rather, the scope of the invention should be measured by the appended claims and their legal equivalents.

I claim:

1. An communication system comprising a primary device and a relay communication device said primary device comprising a controller, a short range signal transmitter, and a power source, and at least one switch, and an indicator signal element and a short range signal receiver wherein said receiver is adapted to receive a short range signals reflecting that a transmission signal by said primary device was successfully received by said relay communication device and a second signal was transmitted from said relay communication device according to a predetermined protocol and in response activates said indicator signal element, and in response to activation of said switch, said controller configures an outbound signal that includes instructions to a processor in said relay communication device to relay a predetermined message content to at least one predetermined destination device selected from a plurality of predetermined destination devices that have address information stored in said relay communication device and said second signal further comprises email, text and voice telephonic messages, and said relay communication device sends a first predetermined message to a first selected destination device in response to the detection of a signal from said primary device and transmits subsequent messages either in response to reply signals from the first destination device or, in the absence of reply signals from after a predetermined time, sends subsequent messages according to predetermined programing of said relay communication device.

2. The system of claim 1 wherein said indicator signal element is activated in response to the successful transmission of said first signal and again in response to the successful transmission of said second signals.

3. The system recited in claim 2 wherein said indicator signal element comprises a vibratory device.

4. The system of claim 1 wherein said signal element comprises a LED and said LED is activated in response to the successful transmission and reception of said first signal by said relay communication device and again in response to the successful transmission of said second signal from said relay communication device.

5. The system of claim 1 wherein said relay communication device further provide a signal to said primary device to activate said indicator signal element in response to an acknowledgment signal from a destination device.

6. The system of claim 5 wherein said indicator signal element comprises a speaker.

7. The system recited in claim 1 wherein said short range frequency signal comprises a signal transmitted in accordance with the Bluetooth standard.

8. The system recited in claim 1 wherein said relay device comprises a software application for a smart phone wherein said application provides instructions to a processor associated with said smart phone to recognize said short range signal from said primary device, and process said signal and transmit a second transmission signal to predetermined destination devices according to predetermined instructions.

9. The system recited in claim 8 wherein said instructions are for the transmission of data in the form of an audible or voice message to phone numbers which comprise predetermined destination devices.

10. The system recited in claim 8 wherein said instructions further comprise instructions to cause said relay communication device to transmit signals comprising data in the form of email for transmission to predetermined destinations devices.

11. The system recited in claim 1 further comprising a loudspeaker and a microphone and said relay communication device opens a voice channel between said destination device and said primary device.

12. The system recited in claim 1 wherein said primary device further comprises a plurality of manual switches, wherein at least two manual switches must be activated to initiate a transmission from said primary device to said relay communication device.

13. The system recited in claim 1 further comprising a global positioning receiver and processor, said global positioning receiver and said processor located in said relay device, and said signal transmitted from said device includes information relating to data determined by said global positioning receive and processor.

14. The system of claim 8 wherein said relay communication device contacts a sequence of phone numbers in a predetermined serial sequence until a communication to a destination device is successful and said destination device transmits a recognized acknowledgment of said communication, and wherein said recognition is determined by predetermined programed instruction stored in a memory associated with said relay.

15. The system of claim 1 wherein said primary device comprises a speaker and said relay communication relay device is provided with an input function to allow a user to send a signal from said relay communication device to said primary device to broadcast from said loudspeaker an audio signal whereby said audio signal aids in the location of the primary device.

* * * * *